(12) United States Patent
Mail et al.

(10) Patent No.: US 8,782,281 B2
(45) Date of Patent: Jul. 15, 2014

(54) OPTIMALLY ADAPTING MULTIMEDIA CONTENT FOR MOBILE SUBSCRIBER DEVICE PLAYBACK

(75) Inventors: David Mail, Zur Igal (IL); Hillel Solow, Beit Shemesh (IL); Erez Waisbard, Or-Yehuda (IL); Anatoly Seldin, Jerusalem (IL); Carmi Bogot, Maaleh Adumim (IL)

(73) Assignee: Cisco Technology Inc., San Jose, CA (US)

( * ) Notice: Subject to any disclaimer, the term of this patent is extended or adjusted under 35 U.S.C. 154(b) by 316 days.

(21) Appl. No.: 10/589,417

(22) PCT Filed: Mar. 21, 2005

(86) PCT No.: PCT/IL2005/000319
§ 371 (c)(1),
(2), (4) Date: Nov. 7, 2006

(87) PCT Pub. No.: WO2005/089061
PCT Pub. Date: Sep. 29, 2005

(65) Prior Publication Data
US 2007/0204064 A1 Aug. 30, 2007

Related U.S. Application Data

(60) Provisional application No. 60/555,717, filed on Mar. 23, 2004, provisional application No. 60/635,719, filed on Dec. 13, 2004.

(51) Int. Cl.
*G06F 15/16* (2006.01)
*H04L 12/58* (2006.01)
*H04L 29/06* (2006.01)

(52) U.S. Cl.
CPC ........... *H04L 21/2541* (2013.01); *H04L 63/105* (2013.01); *H04L 65/80* (2013.01); *H04L 2463/101* (2013.01); *H04L 21/23439* (2013.01); *H04L 21/41407* (2013.01); *H04L 65/605* (2013.01); *H04L 7/1675* (2013.01); *H04L 21/4627* (2013.01); *H04L 21/8352* (2013.01); *H04L 21/2347* (2013.01); *H04L 51/066* (2013.01); *H04L 51/38* (2013.01); *H04L 21/25833* (2013.01); *H04L 51/24* (2013.01); *H04L 21/8355* (2013.01); *H04L 21/2543* (2013.01)
USPC ........................................................ 709/246

(58) Field of Classification Search
CPC ................... G06F 17/30899; G06F 17/30902; G06F 17/30905; G06F 17/30156; G06F 17/30162; H04L 2463/101
USPC ........................................................ 709/246
See application file for complete search history.

(56) References Cited

U.S. PATENT DOCUMENTS 6,128,623 A * 10/2000 Mattis et al. .............. 707/103 R
6,563,517 B1 * 5/2003 Bhagwat et al. ............... 715/735

(Continued)

FOREIGN PATENT DOCUMENTS

EP 1 120 967 A2 8/2001
EP 1 316 900 A2 6/2003

(Continued)

OTHER PUBLICATIONS

May 30, 2008 Office Communication in connection with prosecution of corresponding Chinese patent application.

(Continued)

*Primary Examiner* — Michael Chao
(74) *Attorney, Agent, or Firm* — Husch Blackwell LLP

(57) ABSTRACT

A multimedia content distribution method including a) storing an item of a multimedia content, b) firstly transcoding the content for playback on a first multimedia device, c) generating a content ID of the firstly transcoded content, d) storing the content ID of the firstly transcoded content in association with the stored content, e) accessing the stored content using the content ID of the firstly transcoded content, and f) secondly transcoding the stored content for playback on a second multimedia device.

29 Claims, 7 Drawing Sheets

(56) References Cited

U.S. PATENT DOCUMENTS

| | | | |
|---|---|---|---|
| 6,697,944 B1* | 2/2004 | Jones et al. | 713/168 |
| 6,891,953 B1* | 5/2005 | DeMello et al. | 380/277 |
| 7,003,551 B2* | 2/2006 | Malik | 709/206 |
| 7,010,303 B2 | 3/2006 | Lewis et al. | |
| 7,107,341 B2 | 9/2006 | Mousseau et al. | |
| 7,120,438 B2 | 10/2006 | Omar et al. | |
| 7,162,525 B2* | 1/2007 | Cofta et al. | 709/228 |
| 7,181,538 B2 | 2/2007 | Tam et al. | |
| 7,251,227 B2 | 7/2007 | de Jong et al. | |
| 7,251,486 B2 | 7/2007 | Omar et al. | |
| 7,289,975 B2 | 10/2007 | Clarke et al. | |
| 7,356,591 B2 | 4/2008 | Mousseau et al. | |
| 7,463,602 B2 | 12/2008 | Farnsworth et al. | |
| 7,689,601 B2* | 3/2010 | Wu | 707/999.204 |
| 2001/0002900 A1* | 6/2001 | Romrell | 370/216 |
| 2002/0069218 A1* | 6/2002 | Sull et al. | 707/501.1 |
| 2002/0077986 A1* | 6/2002 | Kobata et al. | 705/52 |
| 2002/0157002 A1* | 10/2002 | Messerges et al. | 713/155 |
| 2003/0007464 A1* | 1/2003 | Balani | 370/310 |
| 2003/0109272 A1 | 6/2003 | Mousseau et al. | |
| 2003/0172121 A1* | 9/2003 | Evans et al. | 709/206 |
| 2004/0046778 A1 | 3/2004 | Niranjan et al. | |
| 2004/0054689 A1 | 3/2004 | Salmonsen et al. | |
| 2004/0098463 A1* | 5/2004 | Shen et al. | 709/213 |
| 2004/0162785 A1* | 8/2004 | Stone | 705/57 |
| 2004/0181550 A1* | 9/2004 | Warsta et al. | 707/104.1 |
| 2004/0186894 A1* | 9/2004 | Jhingan et al. | 709/207 |
| 2004/0199578 A1 | 10/2004 | Kapczynski et al. | |
| 2004/0266435 A1 | 12/2004 | de Jong et al. | |
| 2005/0014494 A1 | 1/2005 | Owen et al. | |
| 2005/0038915 A1 | 2/2005 | Clarke et al. | |
| 2005/0108176 A1 | 5/2005 | Jarol et al. | |
| 2005/0108334 A1 | 5/2005 | Tam et al. | |
| 2005/0129123 A1 | 6/2005 | Xu et al. | |
| 2005/0132209 A1 | 6/2005 | Hug et al. | |
| 2005/0143136 A1* | 6/2005 | Lev et al. | 455/566 |
| 2005/0183118 A1* | 8/2005 | Wee et al. | 725/46 |
| 2005/0203848 A1 | 9/2005 | Van De Heuvel et al. | |
| 2005/0239462 A1 | 10/2005 | Omar et al. | |
| 2006/0048051 A1 | 3/2006 | Lazaridis | |
| 2006/0056447 A1 | 3/2006 | Farnsworth et al. | |
| 2006/0056604 A1 | 3/2006 | Sylthe et al. | |
| 2006/0094427 A1 | 5/2006 | Buckley et al. | |
| 2006/0095954 A1 | 5/2006 | Buckley et al. | |
| 2006/0114870 A1 | 6/2006 | Buckley et al. | |
| 2006/0114871 A1 | 6/2006 | Buckley et al. | |
| 2006/0116125 A1 | 6/2006 | Buckley et al. | |
| 2006/0168129 A1 | 7/2006 | Van Geest et al. | |
| 2006/0168349 A1 | 7/2006 | Van Geest et al. | |
| 2006/0271679 A1 | 11/2006 | Mousseau et al. | |
| 2006/0286976 A1 | 12/2006 | Omar et al. | |
| 2007/0070948 A1 | 3/2007 | Kezys et al. | |
| 2007/0074017 A1* | 3/2007 | Schmidt et al. | 713/150 |
| 2007/0254666 A1 | 11/2007 | De Jong et al. | |
| 2007/0265007 A1 | 11/2007 | Omar et al. | |
| 2007/0271523 A1 | 11/2007 | Lacey et al. | |
| 2008/0125067 A1 | 5/2008 | Bells et al. | |
| 2008/0144501 A1 | 6/2008 | Nagy et al. | |
| 2008/0209000 A1 | 8/2008 | Schmidt | |
| 2008/0279133 A1 | 11/2008 | Bienfait et al. | |
| 2008/0288449 A1 | 11/2008 | Kim et al. | |
| 2008/0288459 A1 | 11/2008 | Kim et al. | |
| 2008/0288475 A1 | 11/2008 | Kim et al. | |
| 2008/0288476 A1 | 11/2008 | Kim et al. | |
| 2008/0288477 A1 | 11/2008 | Kim et al. | |
| 2008/0288486 A1 | 11/2008 | Kim et al. | |
| 2008/0288515 A1 | 11/2008 | Kim et al. | |
| 2008/0289029 A1 | 11/2008 | Kim et al. | |
| 2008/0298699 A1 | 12/2008 | Yu et al. | |
| 2008/0298701 A1 | 12/2008 | Yu et al. | |
| 2009/0005033 A1 | 1/2009 | Wijayanathan et al. | |

FOREIGN PATENT DOCUMENTS

| | | |
|---|---|---|
| WO | WO 02/052798 A2 | 7/2002 |
| WO | WO 03/007183 A1 | 1/2003 |
| WO | WO 03/007184 A1 | 1/2003 |
| WO | WO 03/007617 A1 | 1/2003 |
| WO | WO 03/040898 A1 | 5/2003 |
| WO | WO 03/046757 A2 | 6/2003 |
| WO | WO 03/049384 A1 | 6/2003 |
| WO | WO 03/077153 A1 | 9/2003 |
| WO | WO 2004/032535 A2 | 4/2004 |
| WO | WO 2005/018169 A1 | 2/2005 |
| WO | WO 2005/018247 A2 | 2/2005 |
| WO | WO 2005/020038 A2 | 3/2005 |
| WO | WO 2005/020107 A1 | 3/2005 |
| WO | WO 2005/020498 A2 | 3/2005 |
| WO | WO 2006/047862 A1 | 5/2006 |
| WO | WO 2006/053420 A1 | 5/2006 |
| WO | WO 2006/056070 A1 | 6/2006 |
| WO | WO 2006/056071 A1 | 6/2006 |
| WO | WO 2006/066382 A1 | 6/2006 |
| WO | WO 2006/066383 A1 | 6/2006 |
| WO | WO 2007/009252 A1 | 1/2007 |
| WO | WO 2007/009253 A1 | 1/2007 |
| WO | WO 2007/009254 A1 | 1/2007 |
| WO | WO 2007/009255 A1 | 1/2007 |
| WO | WO 2007/009256 A2 | 1/2007 |
| WO | WO 2007/009257 A1 | 1/2007 |
| WO | WO 2007/033485 A2 | 3/2007 |
| WO | WO 2007/044016 A1 | 4/2007 |
| WO | WO 2007/131359 A1 | 11/2007 |
| WO | WO 2008/013538 A1 | 1/2008 |
| WO | WO 2008/141002 A1 | 11/2008 |
| WO | WO 2008/141424 A1 | 11/2008 |
| WO | WO 2008/141425 A1 | 11/2008 |
| WO | WO 2008/141426 A1 | 11/2008 |
| WO | WO 2008/141427 A1 | 11/2008 |
| WO | WO 2008/141429 A1 | 11/2008 |
| WO | WO 2008/141430 A1 | 11/2008 |
| WO | WO 2008/141431 A1 | 11/2008 |
| WO | WO 2008/141432 A1 | 11/2008 |
| WO | WO 2008/141433 A1 | 11/2008 |
| WO | WO 2008/141434 A1 | 11/2008 |
| WO | WO 2008/148205 A1 | 12/2008 |
| WO | WO 2008/148206 A1 | 12/2008 |
| WO | WO 2008/148207 A1 | 12/2008 |
| WO | WO 2008/148214 A1 | 12/2008 |

OTHER PUBLICATIONS

"Digital Cellular Telecommunications System (Phase 2+); Universal Mobile Telecommunications System (UMTS); Multimedia Messaging Service (HMS); Functional Description; Stage 2" (ETSI TS 123 140 Technical Specification, V5.9.0, Dec. 2003).

"Digital Rights Management" Version 1.0 (OMA, Oct. 31, 2003).

"DRM Content Format" Version 1.0 (OMA, Nov. 13, 2003).

"Rights Expression Language" Version 1.0 (OMA, Oct. 31, 2003).

Nov. 23, 2009 Office Communication in connection with AU 2005 222680.

May 10, 2010 Office Communication in connection with prosecution of EP 05 71 8892.2.

Nuno Carvalho et al., "PAMM Platform: A DRM Solution for MMS Content" (International Conference on Mobile Business, Jun. 24, 2003).

Frank Hartung, "Mobile DRM" (Digital Rights Management LNCS, Springer-Verlag, pp. 138 149, 2003).

Aug. 6, 2010 Office Communication in connection with prosecution of AU 2005 222680.

May 7, 2013 Office Communication in connection with prosecution of EP 10 008 832.7.

* cited by examiner

OPTIMALLY ADAPTING MULTIMEDIA CONTENT FOR MOBILE SUBSCRIBER DEVICE PLAYBACK

CROSS REFERENCES TO RELATED APPLICATIONS

The present application claims priority from U.S. Provisional Patent Application No. 60/555,717 to Solow et al, filed on Mar. 23, 2004, and U.S. Provisional Patent Application No. 60/635,719 to Solow et al, filed on Dec. 13, 2004, both incorporated herein by reference in their entirety.

FIELD OF THE INVENTION

The present invention relates to communications systems in general, and more particularly to techniques for adapting multimedia content for playback on mobile subscriber devices.

BACKGROUND OF THE INVENTION

The Multimedia Message Service (MMS) provides for the transmission of graphics, video clips, sound files and text messages over wireless networks. Mobile network operators (MNO) and wireless service providers typically implement MMS using MMS Centers (MMSCs), which implement store-and-forward delivery of multimedia messages from providers of multimedia content to mobile subscribers, as well as multimedia message exchange between mobile subscribers. Once a multimedia message is received the MMSC will identify one or more intended recipients of the multimedia message, locate the receiving device of a recipient, which may be a cellular telephone, a PDA or handheld computer, transcode the multimedia message as required for playback on the recipient's device according to the device's multimedia capabilities, and send the multimedia message to the recipient's device.

One challenge facing MNOs and wireless service providers involves adapting multimedia content for the wide variety of mobile subscriber devices in use. Adapting content currently incurs a relatively large computational expense when transcoding content for different playback environments. This is especially acute with respect to multimedia messages sent between disparate mobile subscriber devices. For example, when content that was previously transcoded for playback on one mobile subscriber device is sent from the mobile subscriber device to another mobile subscriber device, the transcoded content is typically transcoded again by the MMSC for playback on the intended recipient's device. This typically results in a lower playback quality than would be the case if the original content was transcoded for playback on the intended recipient's device. In order for the content to be sent from the mobile subscriber device to another mobile subscriber device of a different type, the transcoded data is typically transcoded again to suit the receiving device, often resulting in a further reduction in quality. Adapting content is further hampered by the complexity of implementing Digital Rights Management (DRM) techniques to control access to content by mobile subscriber devices with different DRM capabilities at a time when DRM standards for MMS are still emerging. Techniques which efficiently adapt multimedia content in these respects would therefore be advantageous.

Furthermore, with current systems, in order to provide control over content each mobile subscriber needs to connect to a content server and download the content in a "pull" mode. A system that would allow mobile subscribers to send content to each other that appears to the recipient as if the content were received in a "push" mode, and that allows for rights management for multimedia devices with different DRM capabilities would also be advantageous.

SUMMARY OF THE INVENTION

In one aspect of the present invention a method is provided for distributing multimedia content, the method including a) storing an item of a multimedia content, b) firstly transcoding the content for playback on a first multimedia device, c) generating a content ID of the firstly transcoded content, d) storing the content ID of the firstly transcoded content in association with the stored content, e) accessing the stored content using the content ID of the firstly transcoded content, and f) secondly transcoding the stored content for playback on a second multimedia device.

In another aspect of the present invention the storing step includes storing the item of multimedia content at a multimedia message center (MMSC).

In another aspect of the present invention the storing step includes storing the item of multimedia content together with an original content identifier (ID) identifying the content.

In another aspect of the present invention the storing step includes storing the item of multimedia content together with an original content identifier (ID) that uniquely identifies the content.

In another aspect of the present invention the storing step includes storing the item of multimedia content in its original form.

In another aspect of the present invention the storing step includes storing the item of multimedia content such that the content may be partly or wholly reconstituted.

In another aspect of the present invention the method further includes receiving the original content ID from a provider of the content.

In another aspect of the present invention the method further includes generating the original content ID by applying either of a predefined hashing method and a predefined fingerprinting method to the content and using either of the resulting hash and fingerprint as the original content ID.

In another aspect of the present invention the method further includes associating the original content ID with different transcoded versions of the content.

In another aspect of the present invention the method further includes sending a notification to the first multimedia device indicating that the content is available for download to the multimedia device.

In another aspect of the present invention the method further includes delivering the firstly transcoded content to the first multimedia device.

In another aspect of the present invention the method further includes delivering the firstly transcoded content to the first multimedia device together with any of the content IDs.

In another aspect of the present invention the method further includes g) receiving the firstly transcoded content from the first multimedia device, and h) regenerating the content ID of the firstly transcoded content.

In another aspect of the present invention the regenerating step includes regenerating the content ID of the firstly transcoded content using the same method used to generate the content ID of the firstly transcoded content.

In another aspect of the present invention the method further includes performing steps e)-h) in response to receiving instructions from the first multimedia device to forward the content to the second multimedia device.

In another aspect of the present invention the performing step includes performing where the instructions include any of a copy of the firstly transcoded content and any of the content IDs.

In another aspect of the present invention the method further includes protecting any of the transcoded content with a content protection key (CPK).

In another aspect of the present invention the method further includes identifying any rights associated with providing the content to any of the multimedia devices, generating at least one entitlement as a function of the rights, and providing the content to any of the multimedia devices in accordance with the entitlement.

In another aspect of the present invention the method further includes determining if the copy of the firstly transcoded content is protected, if the copy is protected, determining if the content may be forwarded to the second multimedia device as indicated by any rights associated with either of the content and the recipient of the firstly transcoded content, and if the content may be forwarded, protecting and forwarding the secondly transcoded content to the second multimedia device.

In another aspect of the present invention the method further includes protecting the secondly transcoded content with a content protection key (CPK) associated with the secondly transcoded content.

In another aspect of the present invention the first determining step includes determining that the copy of the firstly transcoded content is protected by identifying a CPK stored in association with the content ID.

In another aspect of the present invention a method is provided for implementing digital rights management (DRM), the method including determining the DRM capabilities of a multimedia device, determining the DRM rights associated with an item of content, determining an optimal level of DRM protection to apply to the content as a function of the capabilities and the rights, and applying the optimal level of DRM protection to the item of content.

In another aspect of the present invention the determining an optimal level step includes determining the optimal level as the highest-ranked level of DRM protection that is both supported by the device and that is indicated by the content rights.

In another aspect of the present invention the determining an optimal level step includes determining the optimal level as the highest-ranked level of DRM protection that is supported by the device.

In another aspect of the present invention the determining an optimal level step includes determining the optimal level as the highest-ranked level of DRM protection that is that is indicated by the content rights and that is below the highest-ranked level of DRM protection that is that is supported by the device.

In another aspect of the present invention a multimedia content distribution system is provided including an MMS server, an MMS relay, a transcoder, and a DRM server, where the MMS server, MMS relay, transcoder, and DRM server are individually or cooperatively operative to store an item of a multimedia content, firstly transcode the content for playback on a first multimedia device, generate a content ID of the firstly transcoded content, store the content ID of the firstly transcoded content in association with the stored content, access the stored content using the content ID of the firstly transcoded content, and secondly transcode the stored content for playback on a second multimedia device.

In another aspect of the present invention any of the MMS server, MMS relay, transcoder, and DRM server are individually or cooperatively operative to track to whom the content is sent and with what rights.

In another aspect of the present invention the DRM server acts as either of a probe and a proxy between any of the MMS server, the MMS relay, and the transcoder.

In another aspect of the present invention a system is provided for distributing multimedia content, the system including a) means for storing an item of a multimedia content, b) means for firstly transcoding the content for playback on a first multimedia device, c) means for generating a content ID of the firstly transcoded content, d) means for storing the content ID of the firstly transcoded content in association with the stored content, e) means for accessing the stored content using the content ID of the firstly transcoded content, and f) means for secondly transcoding the stored content for playback on a second multimedia device.

In another aspect of the present invention the means for storing is operative to store the item of multimedia content at a multimedia message center (MMSC).

In another aspect of the present invention the means for storing is operative to store the item of multimedia content together with an original content identifier (ID) identifying the content.

In another aspect of the present invention the means for storing is operative to store the item of multimedia content together with an original content identifier (ID) that uniquely identifies the content.

In another aspect of the present invention the means for storing is operative to store the item of multimedia content in its original form.

In another aspect of the present invention the means for storing is operative to store the item of multimedia content such that the content may be partly or wholly reconstituted.

In another aspect of the present invention the system further includes means for receiving the original content ID from a provider of the content.

In another aspect of the present invention the system further includes means for generating the original content ID by applying either of a predefined hashing system and a predefined fingerprinting system to the content and using either of the resulting hash and fingerprint as the original content ID.

In another aspect of the present invention the system further includes means for associating the original content ID with different transcoded versions of the content.

In another aspect of the present invention the system further includes means for sending a notification to the first multimedia device indicating that the content is available for download to the multimedia device.

In another aspect of the present invention the system further includes means for delivering the firstly transcoded content to the first multimedia device.

In another aspect of the present invention the system further includes means for delivering the firstly transcoded content to the first multimedia device together with any of the content IDs.

In another aspect of the present invention the system further includes g) means for receiving the firstly transcoded content from the first multimedia device, and h) means for regenerating the content ID of the firstly transcoded content.

In another aspect of the present invention the means for regenerating is operative to regenerate the content ID of the firstly transcoded content using the same system used to generate the content ID of the firstly transcoded content.

In another aspect of the present invention the means e)-h) are operative in response to receiving instructions from the first multimedia device to forward the content to the second multimedia device.

In another aspect of the present invention the instructions include any of a copy of the firstly transcoded content and any of the content IDs.

In another aspect of the present invention the system further includes means for protecting any of the transcoded content with a content protection key (CPK).

In another aspect of the present invention the system further includes means for identifying any rights associated with providing the content to any of the multimedia devices, means for generating at least one entitlement as a function of the rights, and means for providing the content to any of the multimedia devices in accordance with the entitlement.

In another aspect of the present invention the system further includes means for determining if the copy of the firstly transcoded content is protected, means, responsive to the copy being protected, for determining if the content may be forwarded to the second multimedia device as indicated by any rights associated with either of the content and the recipient of the firstly transcoded content, and means, responsive to the content being forwardable, for protecting and forwarding the secondly transcoded content to the second multimedia device.

In another aspect of the present invention the system further includes means for protecting the secondly transcoded content with a content protection key (CPK) associated with the secondly transcoded content.

In another aspect of the present invention the first means for determining is operative to determine that the copy of the firstly transcoded content is protected by identifying a CPK stored in association with the content ID.

In another aspect of the present invention a system is provided for implementing digital rights management (DRM), the system including means for determining the DRM capabilities of a multimedia device, means for determining the DRM rights associated with an item of content, means for determining an optimal level of DRM protection to apply to the content as a function of the capabilities and the rights, and means for applying the optimal level of DRM protection to the item of content.

In another aspect of the present invention the means for determining an optimal level is operative to determine the optimal level as the highest-ranked level of DRM protection that is both supported by the device and that is indicated by the content rights.

In another aspect of the present invention the means for determining an optimal level is operative to determine the optimal level as the highest-ranked level of DRM protection that is supported by the device.

In another aspect of the present invention the means for determining an optimal level is operative to determine the optimal level as the highest-ranked level of DRM protection that is that is indicated by the content rights and that is below the highest-ranked level of DRM protection that is that is supported by the device.

It is appreciated throughout the specification and claims that the term "multimedia" as it applies to content may include audio content, visual content including text, still images, and/or moving images, and any combination thereof.

BRIEF DESCRIPTION OF THE DRAWINGS

The present invention will be understood and appreciated more fully from the following detailed description taken in conjunction with the appended drawings in which.

The same reference characters and numerals appearing on different drawings denote the same elements.

DETAILED DESCRIPTION OF PREFERRED EMBODIMENTS

Figure 1A:
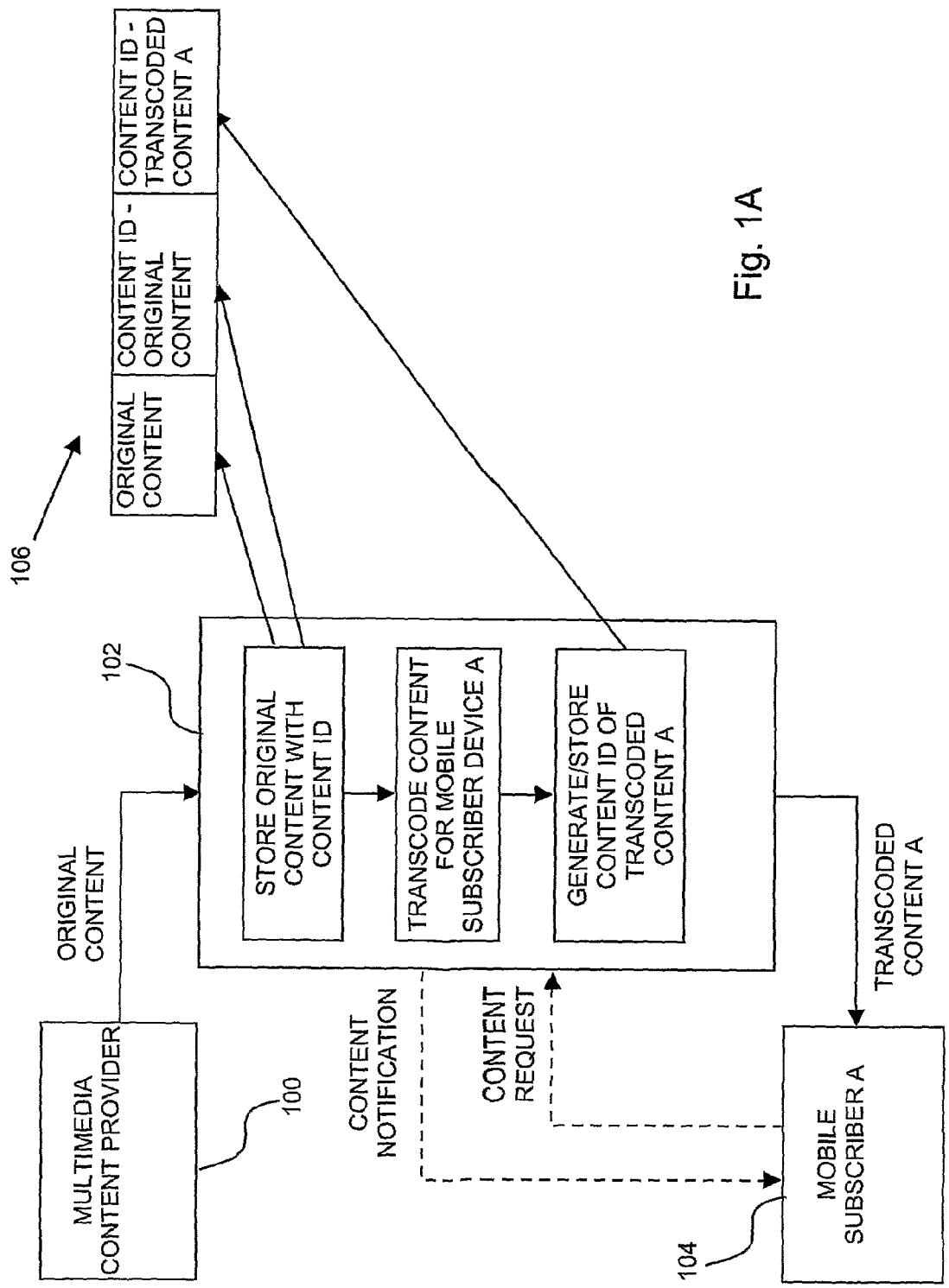
FIGS. 1A and 1B, which are simplified block-flow diagrams of a multimedia content distribution system for non-encrypted content, constructed and operative in accordance with a preferred embodiment of the present invention.
Figure 1B:
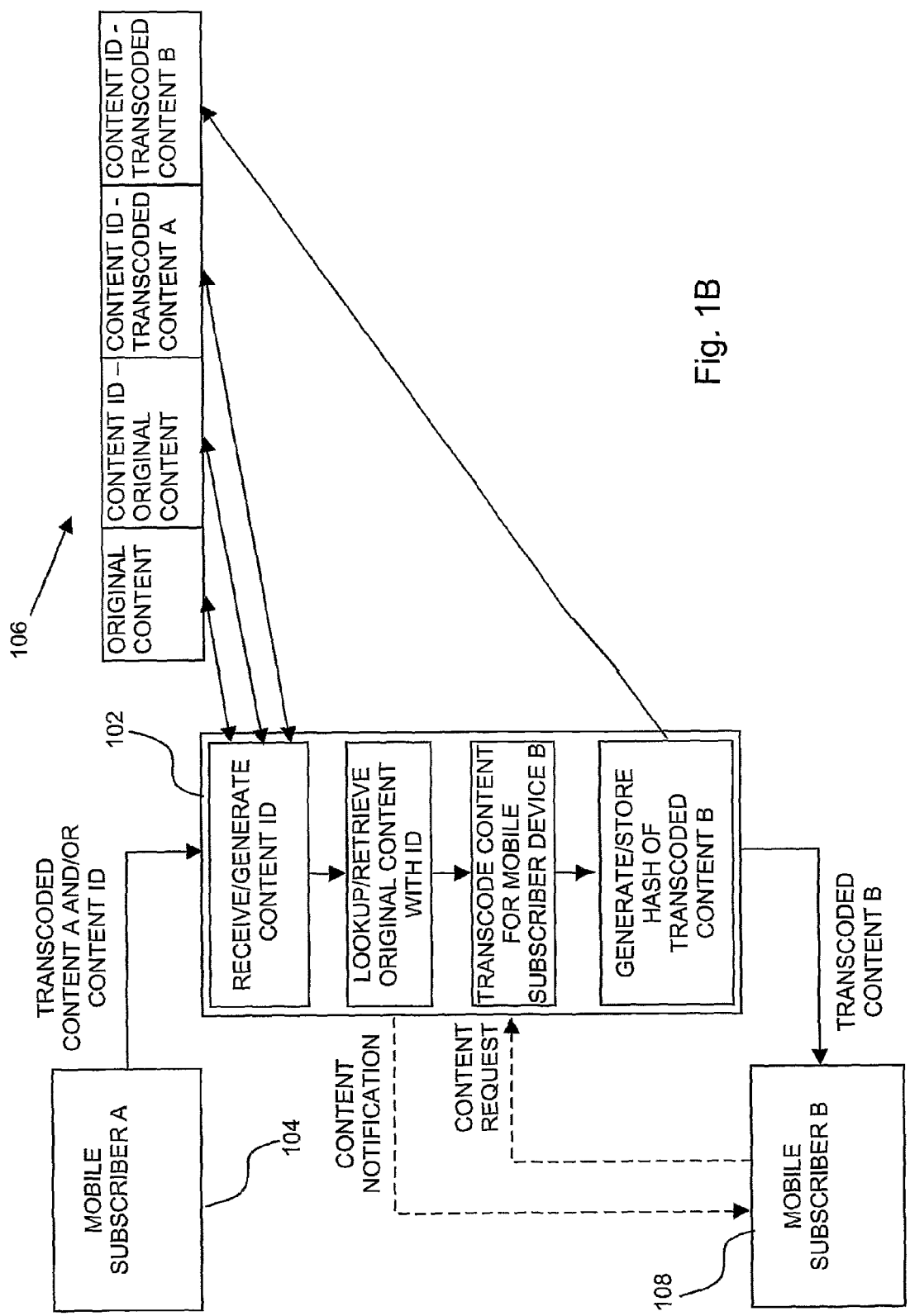

Reference is now made to FIGS. 1A and 1B, which are simplified block-flow diagrams of a multimedia content distribution system for non-encrypted content, constructed and operative in accordance with a preferred embodiment of the present invention. In FIG. 1A a multimedia content provider 100 is shown providing multimedia content to a multimedia message center (MMSC) 102, for delivery to a multimedia device, such as a cellular telephone, of a mobile subscriber 104, labeled 'A'. Preferred implementations of MMSC 102 are described in greater detail hereinbelow with reference to FIGS. 2 and 3. After receiving the content, MMSC 102 preferably stores the content in a database 106, either in its original form or otherwise such that the original content may be partly or wholly reconstituted. The content is preferably stored along with an original content identifier (ID) that preferably uniquely identifies the content. The original content ID may be received from multimedia content provider 100 or may be generated for the content using any suitable technique. For example, the original content ID may be generated by applying a predefined hashing or fingerprinting method to the content and using the resulting hash or fingerprint as the original content ID. The same original content ID associated with the original content received from multimedia content provider 100 may be associated with different transcoded versions of the content as may be prepared for playback by different multimedia devices. Alternatively, a different content ID may be generated by applying a predefined hashing or fingerprinting method to each transcoded version of the content and using the resulting hash or fingerprint as the content ID for its associated transcoded version. In this scenario, the content ID of each transcoded version is preferably stored by MMSC 102 in database 106 together with the original content and/or the original content ID of the original content.

Once the content is received from multimedia content provider 100, MMSC 102 preferably sends a notification to the multimedia device of mobile subscriber A indicating that content intended for subscriber A is available for download from MMSC 102. When mobile subscriber A contacts MMSC 102 to retrieve the content, or in anticipation of such contact, MMSC 102 may transcode the content as necessary for playback on his/her multimedia device whose characteristics may be determined by MMSC 102 using conventional techniques. A content ID of the content transcoded for mobile subscriber A may then preferably generated as described above and stored in database 106 in association with the original content. The content transcoded for mobile subscriber A is then delivered to mobile subscriber A using conventional techniques. The transcoded content may be transmitted to mobile subscriber A together with the original content ID associated with the original content, which may be transmitted "in the clear" or unencrypted, and/or together with the content ID generated for the transcoded content.

It will be appreciated that once a content ID is generated by MMSC 102 for a specific content item that has been transcoded for a particular type of recipient multimedia device, a content ID need not be generated again for the transcoded content adapted for the same type of device as long as the content ID is retained by MMSC 102. The transcoded content may itself optionally be stored in database 106, such as in anticipation of the transcoded content being provided to other mobile devices for which the transcoded content is adapted for playback.

In the system of FIG. 1B MMSC 102 is shown receiving from mobile subscriber A instructions to forward content previously provided to mobile subscriber A to the multimedia device of a mobile subscriber 108, labeled 'B'. The instructions may include a copy of the transcoded content previously provided to mobile subscriber A, the original content ID associated with the original content, and/or the content ID generated for the transcoded content. After receiving the instructions from mobile subscriber A, MMSC 102 preferably sends a notification to the multimedia device of mobile subscriber B indicating that content intended for subscriber B is available for download from MMSC 102. When mobile subscriber B contacts MMSC 102 to retrieve the content, or in anticipation of such contact, if a content ID associated with the content is received from mobile subscriber A, such as a part of submitted content data, MMSC 102 may determine the original content by looking up the content ID in database 106. If no content ID is received from mobile subscriber A, MMSC 102 preferably regenerates a content ID of the received content using the same method used to created the content ID when previously transcoding the content for mobile subscriber A. MMSC 102 then looks up the regenerated content ID in database 106 to identify the original content associated with the content ID. Once found, the original content is retrieved and transcoded as necessary for playback on the multimedia device of mobile subscriber B whose characteristics may be determined by MMSC 102 using conventional techniques. As before, a content ID of the content transcoded for mobile subscriber B may be generated using any suitable method, preferably being the same method previously used to generate a content ID for the content transcoded for mobile subscriber A. The content ID is then preferably stored in database 106 in association with the original content. The content transcoded for mobile subscriber B is then delivered to mobile subscriber B using conventional techniques.

Figure 1C:
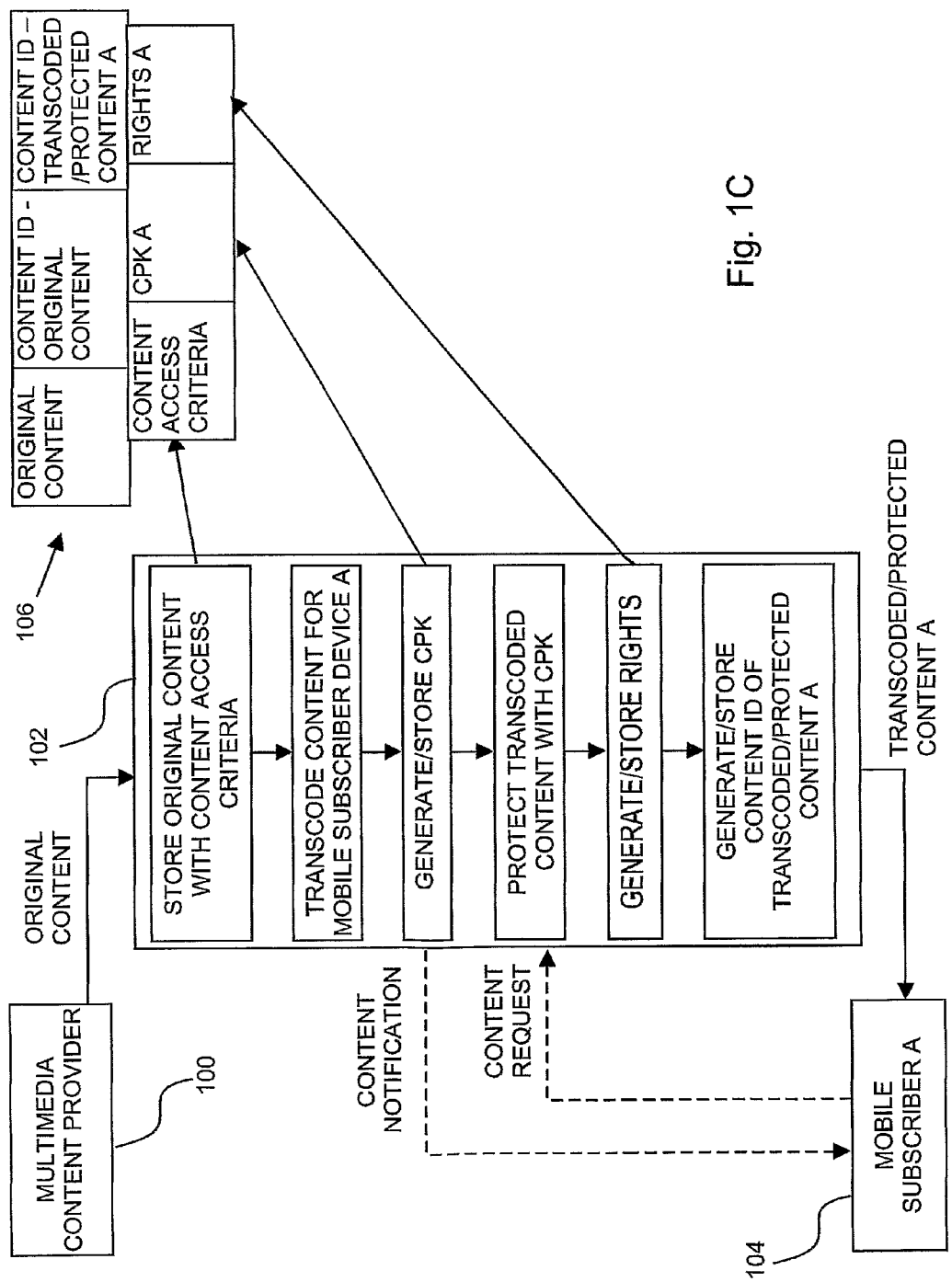
FIGS. 1C and 1D, which are simplified block-flow diagrams of a multimedia content distribution system for encrypted content, constructed and operative in accordance with a preferred embodiment of the present invention.
Figure 1D:
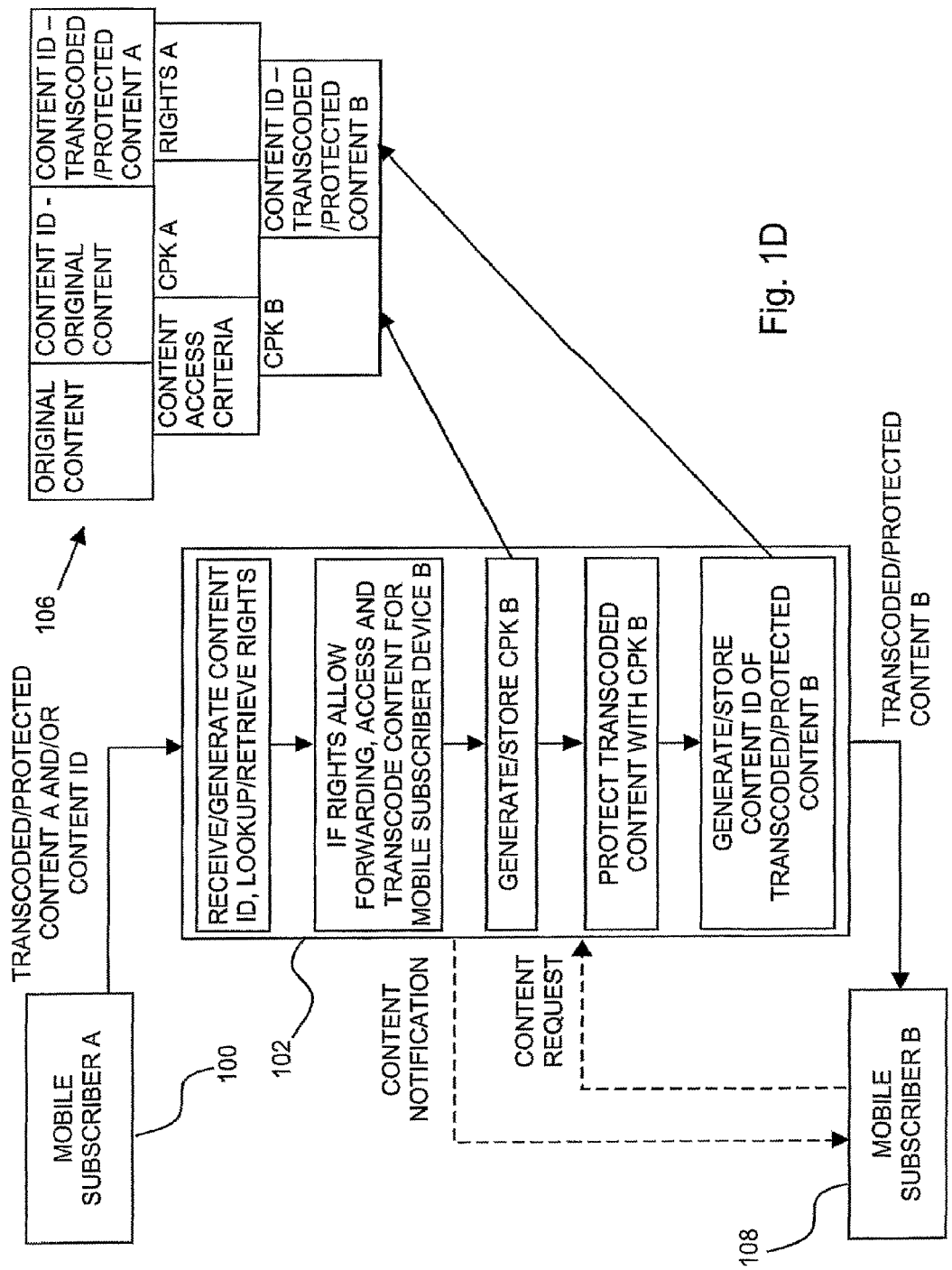

Reference is now made to FIGS. 1C and 1D, which are simplified block-flow diagrams of a multimedia content distribution system for encrypted content, constructed and operative in accordance with a preferred embodiment of the present invention. The system of FIG. 1C is similar to the system of FIG. 1A except as is now noted. In the system of FIG. 1C MMSC 102 stores content access criteria (e.g. "forward lock") in database 106 in association with the original content, where the content access criteria may be specified and provided by multimedia content provider 100 or the service provider (e.g. a MNO). MMSC 102 preferably generates a Content Protection Key (CPK) using conventional key generation techniques and stores the CPK in database 106 in association with the content. The CPK may be generated once for a content item and may be reused for various mobile subscriber devices. Alternatively, a unique CPK may be generated for different mobile subscriber devices and even for different transactions involving the same mobile subscriber device. After the content is transcoded for mobile subscriber A, MMSC 102 preferably protects the transcoded content using the CPK, such as by employing an encryption method such as AES. MMSC 102 preferably identifies any rights associated with providing content to mobile subscriber A, such as by evaluating the content access criteria associated with the content, as well as any rights associated with mobile subscriber A in accordance with conventional rights assessment techniques. MMSC 102 then preferably generates and stores in database 106 subscribe any entitlements associated with the content, such as whether mobile subscriber A has the right to receive the content. A content ID of the content that has been transcoded and protected for mobile subscriber A may then be generated as described above and stored in database 106 in association with the original content. The transcoded and protected content is then delivered to mobile subscriber A using conventional techniques.

The system of FIG. 1D is similar to the system of FIG. 1B except as is now noted. In the system of FIG. 1D when MMSC 102 receives from mobile subscriber A instructions to send content previously provided to mobile subscriber A to the multimedia device of mobile subscriber B, MMSC 102 receives a content ID of the received content, or generates a content ID of the received content as described above, and then looks up the content ID in database 106 to determine if the received content is protected, such as may be evidenced by the presence of a CPK stored in association with the content ID. If the received content is protected, MMSC 102 preferably identifies the content access criteria, specified by the content or service provider associated with the received content item and then verifies the rights of A, determining if mobile subscriber A is allowed to forward the content to mobile subscriber B. If the content rights do not allow the content to be forwarded, the transaction ends. If the content rights allow the content to be forwarded, MMSC 102 sends a notification to mobile subscriber B indicating that content intended for subscriber B is available for download from MMSC 102. When mobile subscriber B contacts MMSC 102 to retrieve the content, or in anticipation of such contact, MMSC 102 retrieves the original content from database 106 using the content ID. The original content is transcoded according to the multimedia device capabilities of mobile subscriber B. MMSC 102 preferably generates and stores a CPK for mobile subscriber B. Alternatively, MMSC 102 may use the same CPK previously generated for the content item. MMSC 102 protects the transcoded content with the CPK, such as by encrypting the transcoded content with AES. A content ID of the content transcoded and protected for mobile subscriber B is then preferably generated as described above and stored in database 106 in association with the original content. The content transcoded for mobile subscriber B is then delivered to mobile subscriber B using conventional techniques.

Figure 2:
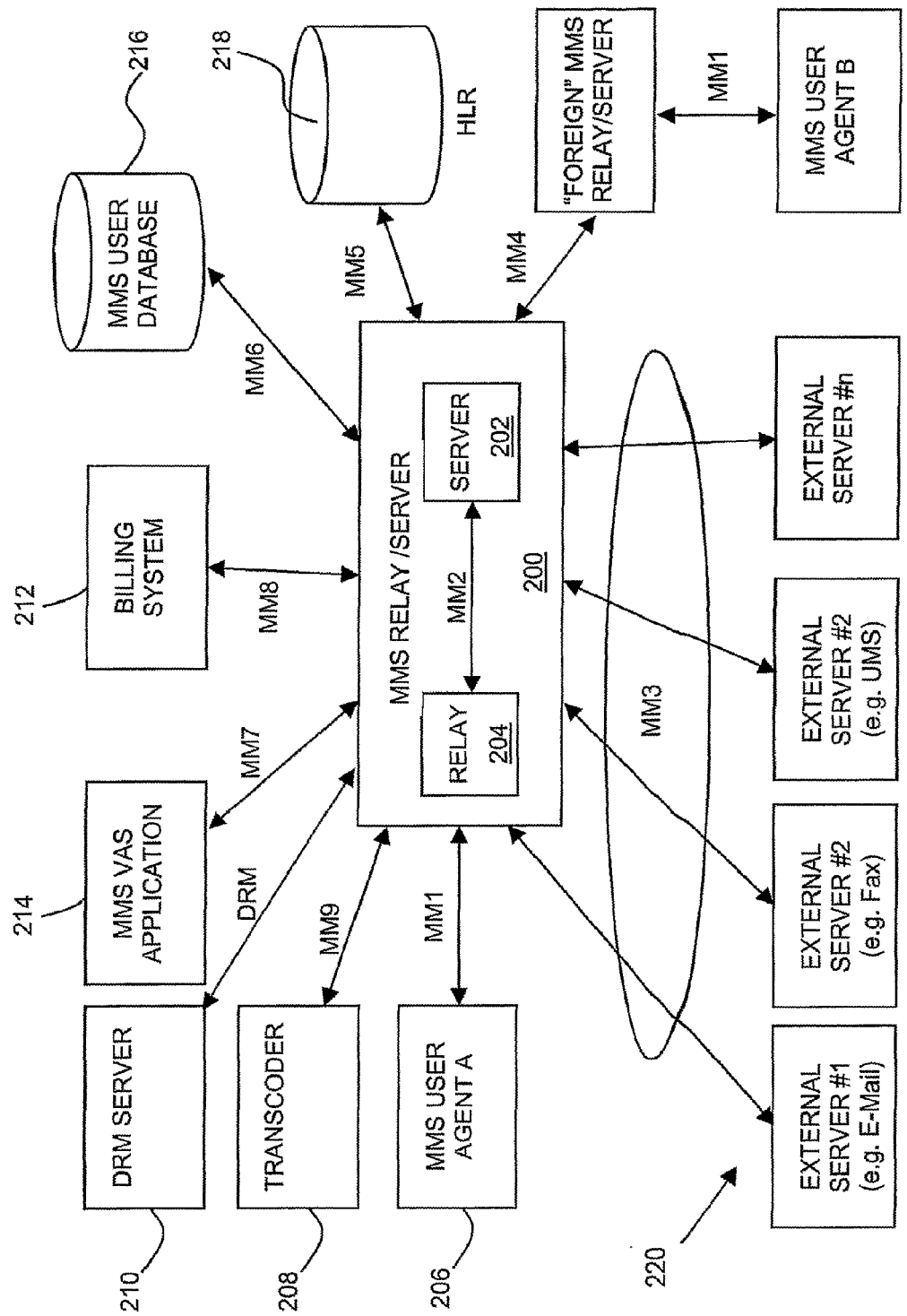
FIG. 2 is a simplified block diagram of a multimedia service center, constructed and operative in accordance with a preferred embodiment of the present invention.

Reference is now made to FIG. 2, which is a simplified block diagram of a multimedia service center, constructed and operative in accordance with a preferred embodiment of the present invention. In FIG. 2 an MMSC 200 is shown having an MMS server 202 which controls the storage aspect of the store-and-forward MMS architecture, and an MMS relay 204 which controls transcoding and delivery of multimedia messages to mobile subscribers. Also shown in FIG. 2 are additional MMS architecture elements, any of which may be incorporated into MMSC 200 or provided externally to MMSC 200 with which MMSC 200 may communicate. These elements may include an MMS user agent 206, that provides users with the ability to view, create, send, edit, delete and manage their multimedia messages, a transcoder 208 for transcoding multimedia content as may be required for playback on mobile subscriber devices, a DRM server 210 for providing digital rights management of content, a billing system 212 for billing subscribers, an MMS value added service (VAS) application 214 for providing multimedia content, such as weather reports and music video clips, an MMS user database 216 for storing subscriber information, a home location register (HLR) 218 which provides subscriber routing information and maintenance of user subscription information, and one or more external servers 220 for providing auxiliary services such as faxing, email, and unified messaging service (UMS). Communications between elements shown in FIG. 2 may be performed in accordance with conventional protocols, such as multimedia protocols MM1-MM9 and DRM protocols as shown.

Any of the functions described hereinabove with reference to FIGS. 1A-1E may be performed by any of the elements shown in FIG. 2, or cooperatively by any combination of any of the elements shown in FIG. 2, such as by DRM server 210 in addition to performing digital rights management operations to protect content. DRM server 210 may perform content ID generation at any stage before or after transcoding and/or protecting content. DRM server 210 and/or any of the elements shown in FIG. 2 may also track to whom content is sent and with what rights, which, for example, may be used to generate a log for a content provider.

Figure 3:
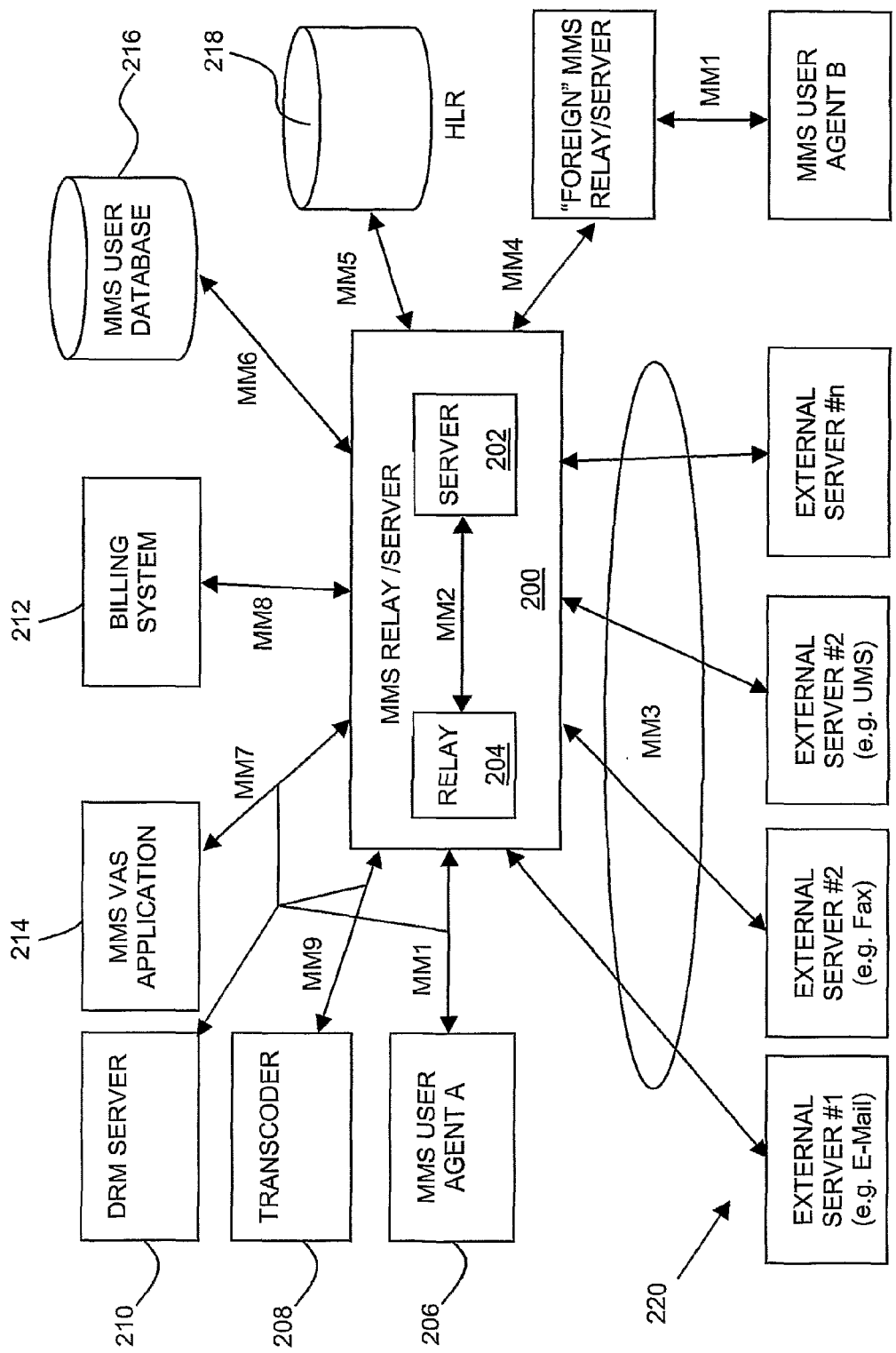
FIG. 3 is a simplified block diagram of a multimedia service center, constructed and operative in accordance with a preferred embodiment of the present invention.

Reference is now made to FIG. 3, which is a simplified block diagram of a multimedia service center, constructed and operative in accordance with a preferred embodiment of the present invention. FIGS. 2 and 3 are substantially similar, with the notable exception that in FIG. 3 DRM server 210 does not interface directly with MMSC 200. Rather, DRM server 210 acts as a probe and/or proxy between MMSC 200 and other elements described in FIG. 2.

Figure 4:
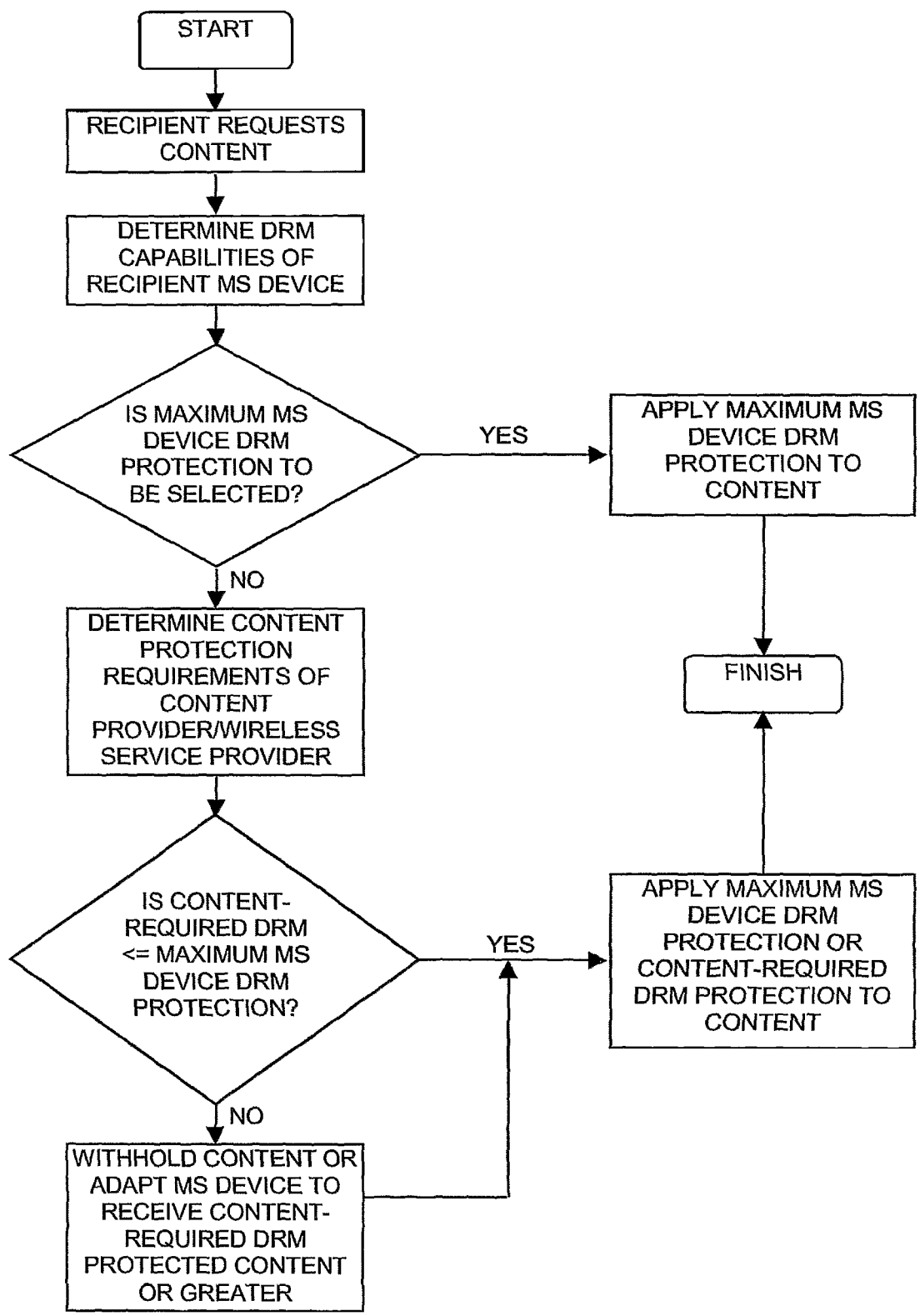
FIG. 4 is a simplified flowchart illustration of a method for implementing best effort DRM, operative in accordance with a preferred embodiment of the present invention.

Reference is now made to FIG. 4, which is a simplified flowchart illustration of a method for implementing DRM, operative in accordance with a preferred embodiment of the present invention. In the method of FIG. 4, which may be implemented by DRM server 210 of FIGS. 2 and 3 separate from or in addition to the functions described hereinabove with reference to FIGS. 1A-1E, MMSC 200 receives content for distribution to a mobile subscriber. DRM Server 210 determines the DRM capabilities of the mobile subscriber device using conventional techniques, such as by receiving information about the device from MMSC 200, which may receive such information from the device itself or from device information previously stored in database 216, and consulting a table of DRM capabilities by device or a User Agent Profile (UAProf) of the device acquired using conventional techniques. Such DRM capabilities may be built in to the device, or may be programmed into the device after manufacture, such as by loading a multimedia player client with DRM capabilities into the device. DRM Server 210 also determines the "content rights" indicating what type of DRM protection applies to the content itself, such as may be indicated by the content provider and/or the service provider. Given the above information DRM Server 210 determines an optimal level of DRM protection to apply to the content as a function of said device DRM capabilities and content rights, such as may be based on a predefined ranking of levels of DRM protection. Thus, in one possible configuration, the highest-ranked level of DRM protection that is both supported by the mobile subscriber device and that is indicated by the content rights may be selected and applied to the content. In another possible configuration, if the content provider and/or the wireless service provider require a level of DRM protection that is ranked below the highest level of protection that is supported by the mobile subscriber device, DRM server 210 may select and apply the level of DRM protection required by the content provider and/or the wireless service provider. In another possible configuration, if the maximum level of DRM protection that is supported by the mobile subscriber device is ranked below a minimum level of DRM protection required by the content provider and/or the wireless service provider, the content may be withheld from the mobile subscriber device. Alternatively, DRM server 210 may provide the mobile subscriber device with software to support either the maximum level of DRM protection that can be supported by the mobile subscriber device using such software or the maximum level of DRM protection required by the content provider and/or the wireless service provider.

The method of FIG. 4 may be used to implement a DRM rights hierarchy, such as is provided by the OMA-1 standard, where different rights modes are represented from strongest to weakest as follows:
SD—separate delivery
CD—combined delivery
FL—forward lock
Clear—"in the clear"
Thus, for example, if these rights are associated with an item of content, delivery of the content to a multimedia device will first be attempted by implementing SD, provided that the multimedia device supports SD. If the multimedia device does not support SD, delivery of the content will then be attempted by implementing CD, and so forth.

Another example of a DRM rights hierarchy may be understood where a device supports two or more different DRM systems, each one with own method of content protection and rights management. For instance, where a device is configured by its manufacturer to support the OMA DRM v1 implementation, and is also equipped with a third-party proprietary DRM system which uses a proven-key management scheme involving secure hardware (e.g. a SIM or other chip in the device platform), the DRM server may chose to protect content using the third-party proprietary DRM format, where the server includes a ranking of the third-party proprietary DRM system with respect to OMA DRM v1 and determines that the third-party DRM provides better security then OMA DRM v1.

The method of FIG. 4 may be understood in the context the following example, where a content provider agrees to provide some video clips to a content aggregator. The content provider stipulates that the strongest OMA-1 rights protection be implemented, that content not be sent in the clear, and that it is willing to receive a payment from the content aggregator for any clip received by a mobile subscriber. The content aggregator has an MMSC connected to a DRM Server as described above. A mobile subscriber, Joe, has a multimedia device which implements OMA-1 forward lock functionality only. The DRM Server analyses the information and makes a decision to protect content as an OMA-1 forward-lock DRM message, since this is the only DRM option available for this user.

Another user, Alice, has a multimedia device which implements the full OMA-1 standard. When Alice retrieves a clip, the DRM Server makes a decision to protect content according to OMA-1 Separate Delivery method. This method may be preferred by the DRM Server because a) it is much more secure, since the content is encrypted, and b) Alice will be able to share content with her friends, while the content is still protected and each new recipient will be required to acquire his/her own rights to access the content Another user, Michael, has a multimedia device that is able to play content provided by the content provider, but has no DRM capabilities. The content aggregator uses the DRM Server to identify users that can receive protected content and thus does not send an announcement to Michael that the content is available. However, Alice forwarded the announcement she received to Michael. When Michael tries to retrieve a clip, the DRM Server informs the MMSC that content can not be protected for Michael's device. Alice may receive a message that Michael cannot receive the forwarded content, and/or Michael may receive a message saying that content that Alice wished to forward can not be released for his device.

Another user, Leo, has a multimedia device with some DRM capabilities provided by the device manufacturer. Additionally, Leo has registered at the content aggregator's WAP site for a premium content service called "Video Hit of The Day." The content aggregator asks Leo to download and install a third-party DRM agent on his device. When Leo attempts to access content, the DRM Server checks its database and finds that Leo has installed a third-party DRM Agent, with this information being recorded by the content aggregator when Leo downloaded the DRM Agent. The DRM Server analyses the DRM capabilities both inherent in Leo's device and otherwise installed in Leo's device and decides that maximum protection may be achieved by using the third-party DRM Agent. The DRM Server protects the content according to the maximum protection supported by the third-party DRM Agent.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention. Various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

What is claimed is:

1. A method for distributing multimedia content, the method comprising:
   storing an item of multimedia content as stored multimedia content together with an original content ID that uniquely identifies the item of multimedia content;
   firstly transcoding said stored multimedia content for playback on a first multimedia device, thereby producing a firstly transcoded version of said stored multimedia content;
   generating a firstly transcoded content ID of said firstly transcoded version of said stored multimedia content, wherein said generating a firstly transcoded content ID comprises:
   (a) applying either of the following to said firstly transcoded version of said stored multimedia content, and producing a result:
   a predefined hashing method; and
   a predefined fingerprinting method; and
   (b) using said result as said firstly transcoded content ID;
   storing said firstly transcoded content ID of said firstly transcoded version of said stored multimedia content, in association with said stored multimedia content and the original content ID;
   receiving, from the first multimedia device, an instruction to forward said item of multimedia content to a second multimedia device, said instruction comprising the firstly transcoded content ID, and the instruction not including the item of multimedia content;
   performing the following in response to said instruction:
   (a) accessing said stored multimedia content using said firstly transcoded content ID; and
   (b) secondly transcoding said stored multimedia content for playback on said second multimedia device, thereby producing a secondly transcoded version of the stored multimedia content;
   identifying any rights associated with providing said content to any of said multimedia devices;
   generating at least one entitlement as a function of said rights; and
   providing said content to any of said multimedia devices in accordance with said entitlement.

2. A method according to claim 1 wherein said storing an item of multimedia content comprises storing said item of multimedia content in its original form.

3. A method according to claim 1 wherein said storing an item of multimedia content comprises storing said item of multimedia content such that said content may be partly or wholly reconstituted.

4. A method according to claim 1 and further comprising receiving said original content ID from a provider of said content.

5. A method according to claim 1 and further comprising generating said original content ID by applying either of a predefined hashing method and a predefined fingerprinting method to said content and using either of the resulting hash and fingerprint as said original content ID.

6. A method according to claim 1 and further comprising associating said original content ID with different transcoded versions of said content.

7. A method according to claim 1 and further comprising sending a notification to said first multimedia device indicating that said content is available for download to said multimedia device.

8. A method according to claim 1 and further comprising delivering said firstly transcoded version of the stored multimedia content to said first multimedia device in an MMS message.

9. A method according to claim 1 and further comprising delivering said firstly transcoded version of the stored multimedia content to said first multimedia device together with any of said content IDs.

10. A method according to claim 1 and further comprising protecting any of said transcoded content with a content protection key (CPK).

11. A method according to claim 1 and further comprising:
determining if said item of multimedia content is protected;
if said item of multimedia content is protected, determining if said item of multimedia content may be forwarded to said second multimedia device as indicated by any rights associated with either of said item of multimedia content and the first multimedia device; and
if said item of multimedia content may be forwarded, protecting and forwarding said secondly transcoded version of the stored multimedia content to said second multimedia device.

12. A method according to claim 11 and further comprising protecting said secondly transcoded version of the stored multimedia content with a content protection key (CPK) associated with said secondly transcoded version of the stored multimedia content.

13. A method according to claim 11 wherein said determining step comprises determining that said item of multimedia content is protected by identifying a content protection key (CPK) stored in association with the firstly transcoded content ID.

14. A multimedia content distribution system comprising:
a server;
a relay;
a transcoder; and
a DRM server,
wherein at least one of a group consisting of said server, relay, transcoder, and DRM server, is implemented at least partially in hardware;
wherein said server, relay, transcoder, and DRM server are individually or cooperatively operative to:
store an item of a multimedia content as stored multimedia content together with an original content ID that uniquely identifies the item of multimedia content;
firstly transcode said stored multimedia content for playback on a first multimedia device, thereby producing a firstly transcoded version of said stored multimedia content;
generate a firstly transcoded content ID of said firstly transcoded version of said stored multimedia content, wherein said generating a firstly transcoded content ID comprises:
(a) applying either of the following to said firstly transcoded version of said stored multimedia content, and producing a result:
a predefined hashing method; and
a predefined fingerprinting method; and
(b) using said result as said firstly transcoded content ID;
store said firstly transcoded content ID of said firstly transcoded version of said stored multimedia content, in association with said stored multimedia content;
receive an instruction, from the first multimedia device, to forward said item of multimedia content to a second multimedia device, said instruction comprising the firstly transcoded content ID, and the instruction not including the item of multimedia content;
perform the following in response to said instruction:
(a) access said stored multimedia content using said firstly transcoded content ID; and
(b) secondly transcode said stored multimedia content for playback on said second multimedia device, thereby producing a secondly transcoded version of the stored multimedia content;
identify any rights associated with providing said content to any of said multimedia devices;
generate at least one entitlement as a function of said rights; and
provide said content to any of said multimedia devices in accordance with said entitlement.

15. A system according to claim 14 wherein any of said server, relay, transcoder, and DRM server are individually or cooperatively operative to track to whom said content is sent and with what rights.

16. A system according to claim 14 wherein said DRM server acts as either of a probe and a proxy between any of said server, said relay, and said transcoder.

17. A system for distributing multimedia content, the system comprising:
means for storing an item of a multimedia content as stored multimedia content together with an original content ID that uniquely identifies the item of multimedia content;
means for firstly transcoding said stored multimedia content for playback on a first multimedia device, thereby producing a firstly transcoded version of said stored multimedia content;
means for generating a firstly transcoded content ID of said firstly transcoded version of said stored multimedia content, wherein said means for generating a firstly transcoded content ID comprises:
(a) means for applying either of the following to said firstly transcoded version of said stored multimedia content, and producing a result:
a predefined hashing method; and
a predefined fingerprinting method; and
(b) means for using said result as said firstly transcoded content ID;
means for storing said firstly transcoded content ID of said firstly transcoded version of said multimedia content, in association with said stored multimedia content;
means for receiving, from the first multimedia device, an instruction to forward said item of multimedia content to a second multimedia device, said instruction comprising the firstly transcoded content ID, and the instruction not including the item of multimedia content;
means for performing the following in response to said instruction:
(a) accessing said stored multimedia content using said firstly transcoded content ID; and
(b) secondly transcoding said stored multimedia content for playback on said second multimedia device, thereby producing a secondly transcoded version of the stored multimedia content;
means for identifying any rights associated with providing said content to any of said multimedia devices;
means for generating at least one entitlement as a function of said rights; and
means for providing said content to any of said multimedia devices in accordance with said entitlement.

18. A system according to claim 17 wherein said means for storing an item of multimedia content is operative to store said item of multimedia content in its original form.

19. A system according to claim 17 wherein said means for storing an item of multimedia content is operative to store said item of multimedia content such that said content may be partly or wholly reconstituted.

20. A system according to claim 17 and further comprising means for receiving said original content ID from a provider of said content.

21. A system according to claim 17 and further comprising means for generating said original content ID by applying either of a predefined hashing system and a predefined fingerprinting system to said content and using either of the resulting hash and fingerprint as said original content ID.

22. A system according to claim 17 and further comprising means for associating said original content ID with different transcoded versions of said content.

23. A system according to claim 17 and further comprising means for sending a notification to said first multimedia device indicating that said content is available for download to said multimedia device.

24. A system according to claim 17 and further comprising means for delivering said firstly transcoded version of the stored multimedia content to said first multimedia device in an MMS message.

25. A system according to claim 17 and further comprising means for delivering said firstly transcoded version of the stored multimedia content to said first multimedia device together with any of said content IDs.

26. A system according to claim 17 and further comprising means for protecting any of said transcoded content with a content protection key (CPK).

27. A system according to claim 17 and further comprising:
means for determining if said item of multimedia content is protected;

means, responsive to said item of multimedia content being protected, for determining if said item of multimedia content may be forwarded to said second multimedia device as indicated by any rights associated with either of said item of multimedia content and the first multimedia device; and means, responsive to said item of multimedia content being forwardable, for protecting and forwarding said secondly transcoded version of the stored multimedia content to said second multimedia device.

28. A system according to claim 27 and further comprising means for protecting said secondly transcoded version of the stored multimedia content with a content protection key (CPK) associated with said secondly transcoded version of the stored multimedia content.

29. A system according to claim 27 wherein said means for determining is operative to determine that said item of multimedia content is protected by identifying a content protection key (CPK) stored in association with the firstly transcoded content ID.

* * * * *

UNITED STATES PATENT AND TRADEMARK OFFICE
CERTIFICATE OF CORRECTION

PATENT NO. : 8,782,281 B2  
APPLICATION NO. : 10/589417  
DATED : July 15, 2014  
INVENTOR(S) : Mail et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 401 days.

Signed and Sealed this
Twenty-fourth Day of May, 2016

Michelle K. Lee
*Director of the United States Patent and Trademark Office*